United States Patent
Fujii et al.

(10) Patent No.: US 7,769,197 B2
(45) Date of Patent: Aug. 3, 2010

(54) ELECTRONIC WATERMARK EMBEDDING METHOD, ELECTRONIC WATERMARK DETECTING METHOD, ELECTRONIC WATERMARK DETECTING APPARATUS AND PROGRAM

(75) Inventors: Ryousuke Fujii, Tokyo (JP); Hiroshi Ito, Tokyo (JP); Kouichi Magai, Tokyo (JP); Mitsuyoshi Suzuki, Tokyo (JP); Minoru Wada, Tokyo (JP); Go Ohtake, Tokyo (JP); Seiichi Goshi, Tokyo (JP)

(73) Assignees: Mitsubishi Electric Corporation, Tokyo (JP); Nippon Hoso Kyokai, Tokyo (JP)

( * ) Notice: Subject to any disclaimer, the term of this patent is extended or adjusted under 35 U.S.C. 154(b) by 1047 days.

(21) Appl. No.: 10/586,997

(22) PCT Filed: Feb. 14, 2005

(86) PCT No.: PCT/JP2005/002166

§ 371 (c)(1),
(2), (4) Date: Jul. 21, 2006

(87) PCT Pub. No.: WO2005/079072

PCT Pub. Date: Aug. 25, 2005

(65) Prior Publication Data

US 2008/0273741 A1    Nov. 6, 2008

(30) Foreign Application Priority Data

Feb. 17, 2004    (JP)    ............... 2004-040331

(51) Int. Cl.
*G06K 9/00* (2006.01)
(52) U.S. Cl. ...................................... 382/100; 380/54

(58) Field of Classification Search .................. 395/326, 395/606, 348; 382/100, 181, 189, 190, 195, 382/209, 220, 224, 227, 282, 305; 715/205, 715/723, 762; 725/105; 345/156, 40; 354/410; 707/3, 6
See application file for complete search history.

(56) References Cited

U.S. PATENT DOCUMENTS 6,049,627 A  *  4/2000  Becker et al. ............... 382/181
(Continued)

FOREIGN PATENT DOCUMENTS

EP    1 006 710 A2    6/2000
(Continued)

OTHER PUBLICATIONS

Kay et al., "Robust Content Based image Watermarking", Proceedings Workshop on Image Analysis for Multimedia Interactive Services, WIAMIS', May 2001.*

*Primary Examiner*—Andrew W Johns
*Assistant Examiner*—Tahmina Ansari
(74) *Attorney, Agent, or Firm*—Birch, Stewart, Kolasch & Birch, LLP

(57) ABSTRACT

An electronic image into which an electronic watermark is to be embedded is divided into a plurality of image regions spatially, and pixels each having a property of being difficult to visually recognize a variation in a pixel value are extracted as adaptive pixels from each of the plurality of image regions. A variation between the pixel values of the adaptive pixels in one of the plurality of image regions and those of the adaptive pixels in an adjacent one of the plurality of image regions is produced, and the pixel values of the adaptive pixels of the plurality of image regions are varied in a time direction according to the value of an embedded bit set of the electronic watermark. An electronic-watermark-embedded image is then generated by making the variation in the pixel values of the adaptive pixels vary step by step at a boundary between the two of the plurality of image regions and/or in the time direction so that the variation makes a slow transition.

22 Claims, 11 Drawing Sheets

U.S. PATENT DOCUMENTS

| | | | |
|---|---|---|---|
| 6,185,312 B1 * | 2/2001 | Nakamura et al. | 382/100 |
| 6,278,494 B1 * | 8/2001 | Kanai et al. | 348/625 |
| 6,307,949 B1 * | 10/2001 | Rhoads | 382/100 |
| 6,381,341 B1 * | 4/2002 | Rhoads | 382/100 |
| 6,600,828 B1 | 7/2003 | Kawamura | |
| 6,711,276 B1 * | 3/2004 | Yoshiura et al. | 382/100 |
| 6,757,405 B1 * | 6/2004 | Muratani et al. | 382/100 |
| 6,809,792 B1 * | 10/2004 | Tehranchi et al. | 352/85 |
| 6,961,444 B2 * | 11/2005 | Levy | 382/100 |
| 7,197,164 B2 * | 3/2007 | Levy | 382/100 |
| 7,567,721 B2 * | 7/2009 | Alattar et al. | 382/248 |
| 2002/0076083 A1 * | 6/2002 | Levy | 382/100 |
| 2002/0168069 A1 * | 11/2002 | Tehranchi et al. | 380/235 |
| 2003/0210784 A1 * | 11/2003 | Noridomi et al. | 380/202 |
| 2004/0247154 A1 * | 12/2004 | Bodo et al. | 382/100 |
| 2004/0250079 A1 * | 12/2004 | Kalker et al. | 713/176 |

FOREIGN PATENT DOCUMENTS

| | | |
|---|---|---|
| EP | 1 253 555 A2 | 10/2002 |
| JP | 10-504944 A | 5/1998 |
| JP | 10-513324 A | 12/1998 |
| JP | 11-341452 A | 12/1999 |
| JP | 2000-4350 A | 1/2000 |
| JP | 2000-13765 A | 1/2000 |
| JP | 2000-50057 A | 2/2000 |
| JP | 2000-165654 A | 6/2000 |
| JP | 2000-216981 A | 8/2000 |
| JP | 2000-332612 A | 11/2000 |
| JP | 2001-346157 A | 12/2001 |
| JP | 2002-118820 A | 4/2002 |
| JP | 2003-32641 A | 1/2003 |
| JP | 2003-143559 A | 5/2003 |
| JP | 2003-169273 A | 6/2003 |
| JP | 2003-302960 A | 10/2003 |
| JP | 2003-304389 A | 10/2003 |
| JP | 2003-304508 A | 10/2003 |
| JP | 2003-319162 A | 11/2003 |
| WO | WO 03/055222 A2 * | 7/2003 |
| WO | WO-2005/112452 A1 | 11/2005 |

* cited by examiner

FIG.2
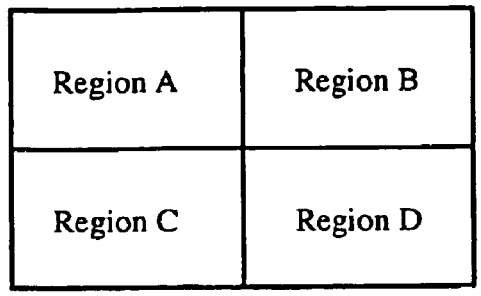
FIG.3
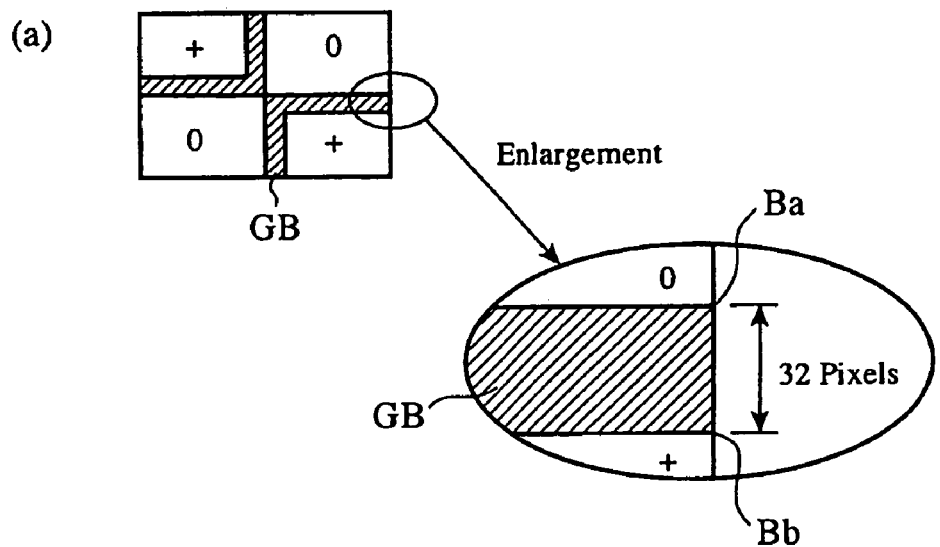
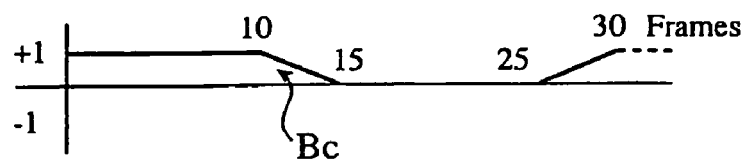

FIG.4
(a)
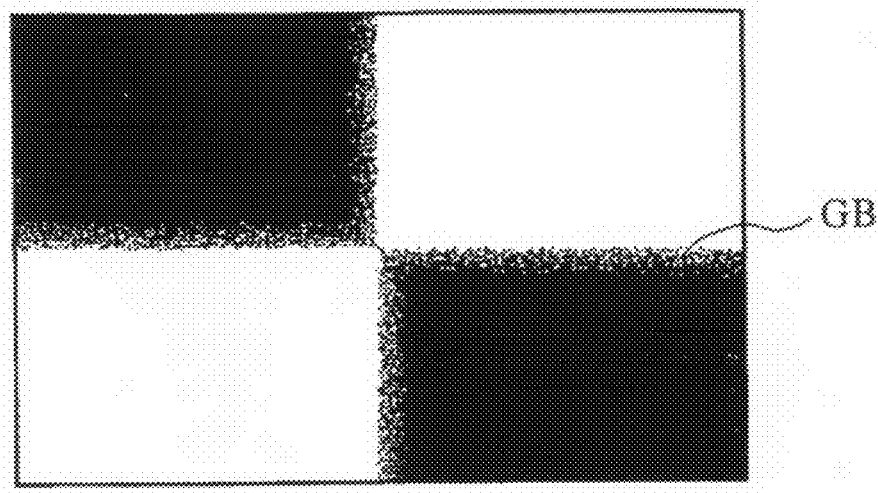
(b)
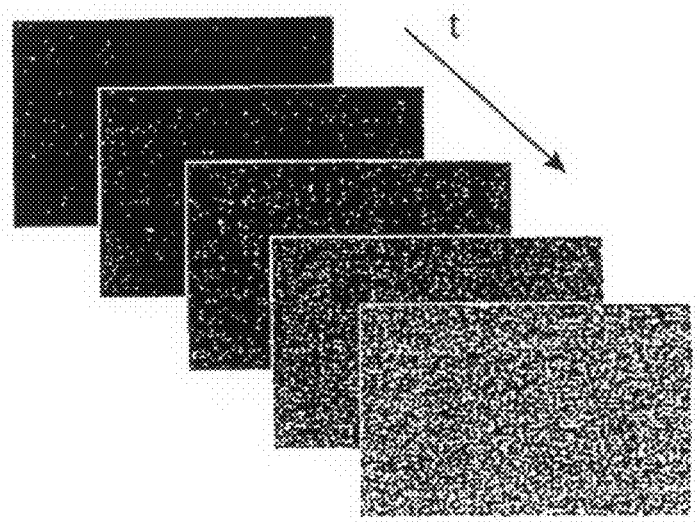

FIG.5

| Embedded Bit Set | Embedding Period |
|---|---|
| 00 | +1 ⎯⎯ Adaptation A ⎯⎯ 15 ⎯⎯⎯⎯⎯⎯⎯ 30 Frames<br>-1 ⎯⎯⎯⎯⎯⎯⎯⎯⎯ 16 ⎯⎯ Adaptation B ⎯⎯⎯ |
| 01 | +1 ⎯⎯⎯⎯⎯⎯⎯⎯⎯ Adaptation B 16 ⎯⎯⎯⎯⎯⎯⎯<br>-1 ⎯⎯ Adaptation A ⎯⎯ 15 ⎯⎯⎯⎯⎯⎯ 30 Frames |
| 10 | +1 ⎯ Adaptation A 7 ⎯⎯⎯⎯⎯⎯ Adaptation A 23 ⎯⎯ 30 Frames<br>-1 ⎯⎯⎯ 8 ⎯⎯ Adaptation B ⎯⎯ 22 ⎯⎯⎯⎯ |
| 11 | +1 ⎯⎯⎯ 8 ⎯⎯ Adaptation B ⎯⎯ 22 ⎯⎯⎯⎯<br>-1 ⎯ Adaptation A 7 ⎯⎯⎯⎯⎯⎯ 23 Adaptation A 30 Frames |

FIG.6

| Embedded Bit Set | Adaptation A | | Adaptation B |
|---|---|---|---|
| | Brightness Value of 129 or More | Brightness Value of 128 or Less | Brightness Value of 180 or More |
| 00 | +1 | Next 50% +1 | +1 |
| 01 | -1 | Next 50% -1 | -1 |
| 10 | +1 | Next 50% +1 | +1 |
| 11 | -1 | Next 50% -1 | -1 |

FIG.8

| Embedded Bit Set | Frame Difference | Adaptation A | | | Adaptation B |
|---|---|---|---|---|---|
| | | Brightness Value of 128 or More | Brightness Value of Less Than 128 Next 50% | Brightness Value of Less Than 128 Remainder | Brightness Value of 180 or More |
| 00 | ≤2 | +1 | Null | Null | +1 |
| | 3≤ And ≤7 | +1 | +1 | Null | +1 |
| | ≥8 | +1 | +1 | +1 | +1 |
| 01 | ≤2 | -1 | Null | Null | -1 |
| | 3≤ And ≤7 | -1 | -1 | Null | -1 |
| | ≥8 | -1 | -1 | -1 | -1 |

FIG.9
(a)
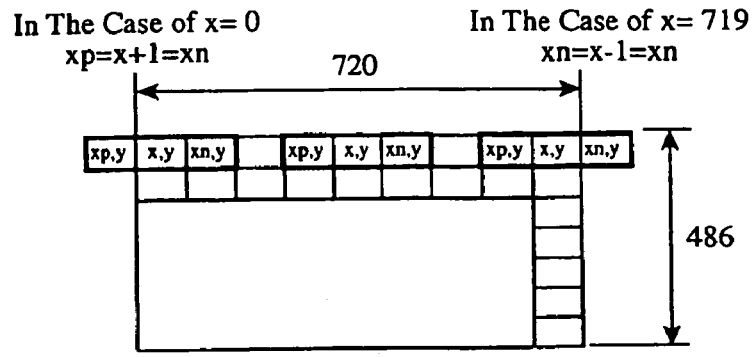
(b)
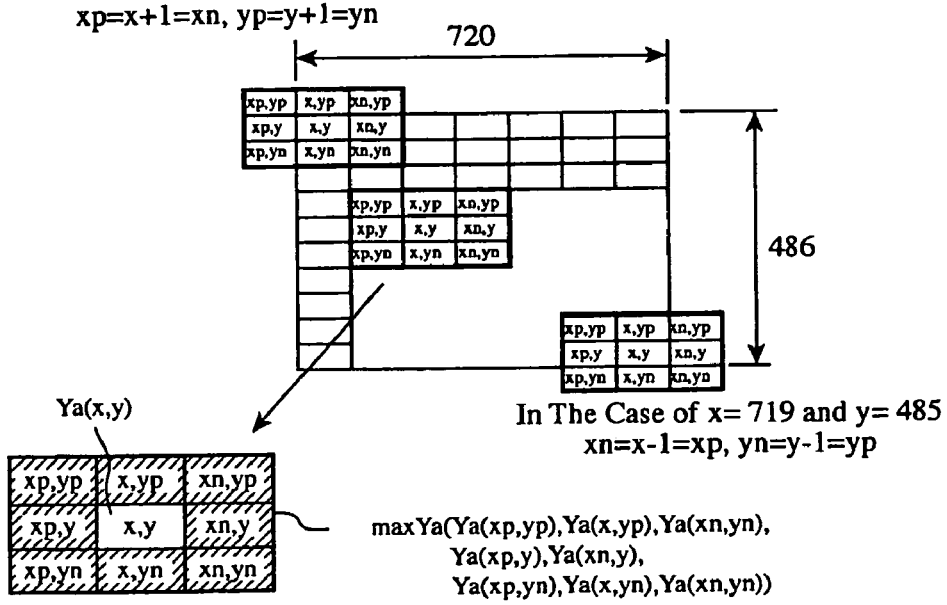
(c)
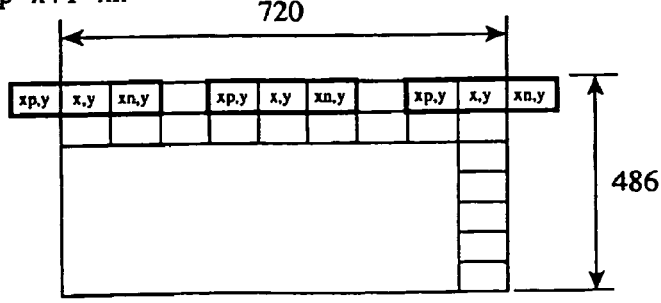

| Degree of Edge (Yc) | Adaptation A | | Adaptation B |
|---|---|---|---|
| | Brightness Value of Less Than 128 | Brightness Value of 128 or More | Brightness Value of 180 or More |
| Less Than 10 | Null | Null | Null |
| 10 or More | Null | 1 | 1 |

FIG.12
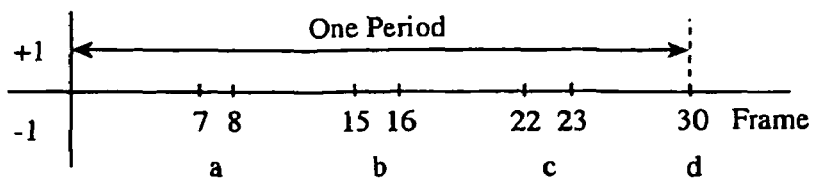
FIG.13
| Embedded Bit Set | $Gap_{ac}$ | $Gap_{bd}$ |
|---|---|---|
| Not Detected | $|Z|<0.1$ or $|Z|\times 2 \geqq |X|$ | |
| 00 | Z | X |
| 01 | Z | -X |
| 10 | X | Z |
| 11 | -X | Z |
FIG.14
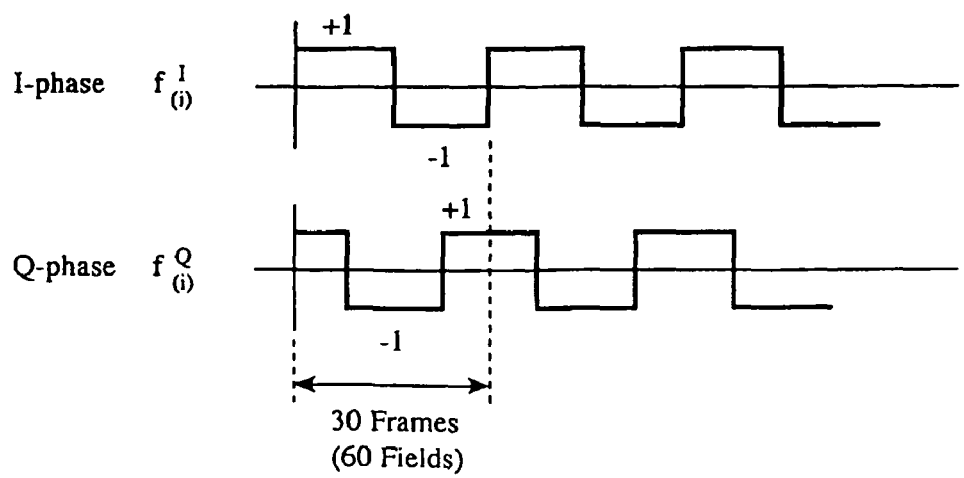

FIG.15

| Embedded Bit Set | C(I) | C(Q) |
|---|---|---|
| Not Detected | $|Z|<0.1$ or $|Z|\times 2 \geqq |X|$ | |
| 00 | X | Z |
| 01 | -X | Z |
| 10 | Z | X |
| 11 | Z | -X |

FIG.16

| | | Gap Detection | | | | |
|---|---|---|---|---|---|---|
| | | 00 | 01 | 10 | 11 | Not Detected |
| Correlation Detection | 00 | 00 | Not Detected | Not Detected | Not Detected | 00 |
| | 01 | Not Detected | 01 | Not Detected | Not Detected | 01 |
| | 10 | Not Detected | Not Detected | 10 | Not Detected | 10 |
| | 11 | Not Detected | Not Detected | Not Detected | 11 | 11 |
| | Not Detected | 00 | 01 | 10 | 11 | Not Detected |

FIG.17

| Gap And Correlation For Each Frame | Clip Value |
|---|---|
| $<-1$ | -1 |
| $>+1$ | +1 |

ELECTRONIC WATERMARK EMBEDDING METHOD, ELECTRONIC WATERMARK DETECTING METHOD, ELECTRONIC WATERMARK DETECTING APPARATUS AND PROGRAM

FIELD OF THE INVENTION

The present invention relates to an electronic watermark embedding method of and an electronic watermark detecting method of being able to detect an electronic watermark from a recaptured image acquired by recapturing an image displayed on a screen, such as a display's screen, and an apparatus and a program which use these methods.

BACKGROUND OF THE INVENTION

Improvements in the performance of television cameras in recent years and reduction in the costs of television cameras make it easy to recapture an image or video image displayed on a screen, such as a display's screen, with a sufficient image quality. However, such technical improvements cause unauthorized use of work, such as a recaptured image or video image. For example, there have been reported cases where a video image screened in a movie theater was recaptured directly with a digital camera, and was copied to a medium, such as a DVD (Digital Versatile Disk), and the medium was on sale illegally.

Nonpatent reference 1 discloses an electronic watermark technology which is intended for prevention of unauthorized use of such a recaptured image. According to this prior art technology, brightness variations with respect to a time direction (e.g., a direction of frames or fields) are provided, as an electronic watermark, to a moving image into which the electronic watermark is to be embedded.

By thus embedding copyright information, as an electronic watermark, into the target image, the user can extract the above-mentioned copyright information even from a recaptured image which is illegally copied from the target image, and can assert the copyright. This translates into prevention of illegal copy of the target image using image recapturing.

Nonpatent reference 1: J. Haitsma and T. Kalker, "A watermarking scheme for digital cinema", ICIP'01—IEEE, pp. 487-489

In accordance with the prior art electronic watermark technology for electronically watermarking recaptured images which is disclosed by nonpatent reference 1, an electronic watermark which is effective even for recaptured images is embedded into a moving image by changing the brightness of the moving image with respect to a time direction (e.g., a direction of frames or fields). A problem with the prior art electronic watermark technology is, however, that depending on the target moving image into which the electronic watermark is embedded, a difference in the brightness between frame images, which is caused by the brightness variations with respect to the time direction which are provided for the target moving image, can be viewed as a light or dark portion while the moving image is played back.

Furthermore, as a method of increasing the amount of embedding of an electronic watermark, there can be provided a method of dividing each frame image (or each field image) of the target moving image into a plurality of regions spatially, and producing a variation in the pixel values in each of the plurality of divided regions of each frame image according to an embedded bit. A problem with the related art method is, however, that the image quality of the target moving image degrades depending upon the target moving image into which the electronic watermark is to be embedded.

For example, when each frame image or the like is spatially divided into a plurality of regions and brightness modulation is performed on each of the plurality of divided regions, a difference in the brightness occurs among the plurality of divided regions of each frame image due to the brightness modulation and a boundary line between any two of the plurality of divided regions can be viewed while the moving image is played back, depending upon the target moving image into which the electronic watermark is to be embedded.

The present invention is made in order to solve the above-mentioned problems, and it is therefore an object of the present invention to provide an electronic watermark embedding method of being able to embed an electronic watermark which is effective for recaptured images into a target image without degrading the image quality of the target image, and an electronic watermark detecting method of being able to detect the electronic watermark with a high degree of precision.

It is a further object of the present invention to provide an electronic watermark embedding apparatus which uses the above-mentioned electronic watermark embedding method, an electronic watermark detecting apparatus which uses the above-mentioned electronic watermark detecting method, a program which makes a computer function as the electronic watermark embedding apparatus, and a program which makes a computer function as the electronic watermark detecting apparatus.

DISCLOSURE OF THE INVENTION

In accordance with an aspect of the present invention, there is provided an electronic watermark embedding method including: a dividing processing step of dividing an electronic image into which an electronic watermark is to be embedded into a plurality of image regions spatially; an adaptive extraction step of extracting, as adaptive pixels, pixels each having a property of being difficult to visually recognize a variation in a pixel value from each of the plurality of image regions; and an embedding step of producing a variation between the pixel values of the adaptive pixels in one of the plurality of image regions and those of the adaptive pixels in an adjacent one of the plurality of image regions, and varying the pixel values of the adaptive pixels of the plurality of image regions in a time direction, according to a value of an embedded bit set of an electronic watermark, and of generating an electronic-watermark-embedded image by making the variation in the pixel values of the adaptive pixels vary step by step at a boundary between the two of the plurality of image regions and/or in the time direction so that the variation makes a slow transition.

Therefore, the present invention offers an advantage of being able to maintain the resistance of the electronic watermark to recapturing of the target image to which the electronic watermark is embedded, and also to reduce the visual disturbance due to the embedding of the electronic watermark remarkably.

In accordance with another aspect of the present invention, there is provided an electronic watermark detecting method including: a Gap detection step of detecting, as a Gap value, a pixel value difference corresponding to a pixel value variation in a time direction which is caused by the embedding of an electronic watermark for each of a plurality of image regions of an electronic image from which the electronic watermark is to be detected; a correlation detection step of detecting a correlation value showing a correlation between a pattern of a pixel value variation in the time direction which is produced between the pixel values in one of the plurality of image regions and those in an adjacent one of the plurality of image regions, which is caused by the electronic watermark to be embedded in the electronic image from which the electronic watermark is to be detected, and a pattern of the pixel value variation in the time direction of the electronic image from which the electronic watermark is to be detected; and an embedded bit judgment step of judging the embedded bit set from results of the detection of the Gap value and the detection of the correlation value for each of the plurality of image regions, and judging results of the judgment complementarily so as to determine the embedded bit set finally.

Therefore, the present invention offers an advantage of being able to improve the reliability of the detection result of the electronic watermark, and the accuracy of the detection of the electronic watermark.

BRIEF DESCRIPTION OF THE FIGURES

FIG. 2 is a diagram showing image regions into which an input electronic image is divided spatially;

FIG. 3 is a diagram showing an example of an electronic watermark pattern in accordance with embodiment 1 and a temporal variation in the electronic watermark pattern;

FIG. 4 is a diagram showing an example of the electronic watermark pattern including a spatial guard band and a guard band in a time direction;

FIG. 5 is a diagram showing adaptation processing for each embedded bit set, and a temporal variation in the adaptation processing;

FIG. 6 is a diagram showing the adaptation processing at a brightness level associated with each embedded bit set;

FIG. 8 is a diagram showing adaptation processing using a frame difference obtained for each embedded bit set;

FIG. 9 is a diagram explaining edge adaptation processing carried out by an electronic watermark embedding apparatus in accordance with embodiment 3;

FIG. 12 is a diagram showing Gap detection points during each electronic watermark embedding interval;

FIG. 13 is a diagram showing a relationship between Gap values and embedded bit sets;

FIG. 14 is a diagram showing the phases of embedding of an electronic watermark;

FIG. 15 is a diagram showing a relationship between correlation values and embedded bit sets;

FIG. 16 is a diagram showing a relationship between embedded bit values which are determined through Gap detection and correlation detection, and a finally-determined embedded bit value;

FIG. 17 is a diagram explaining clip processing; and

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
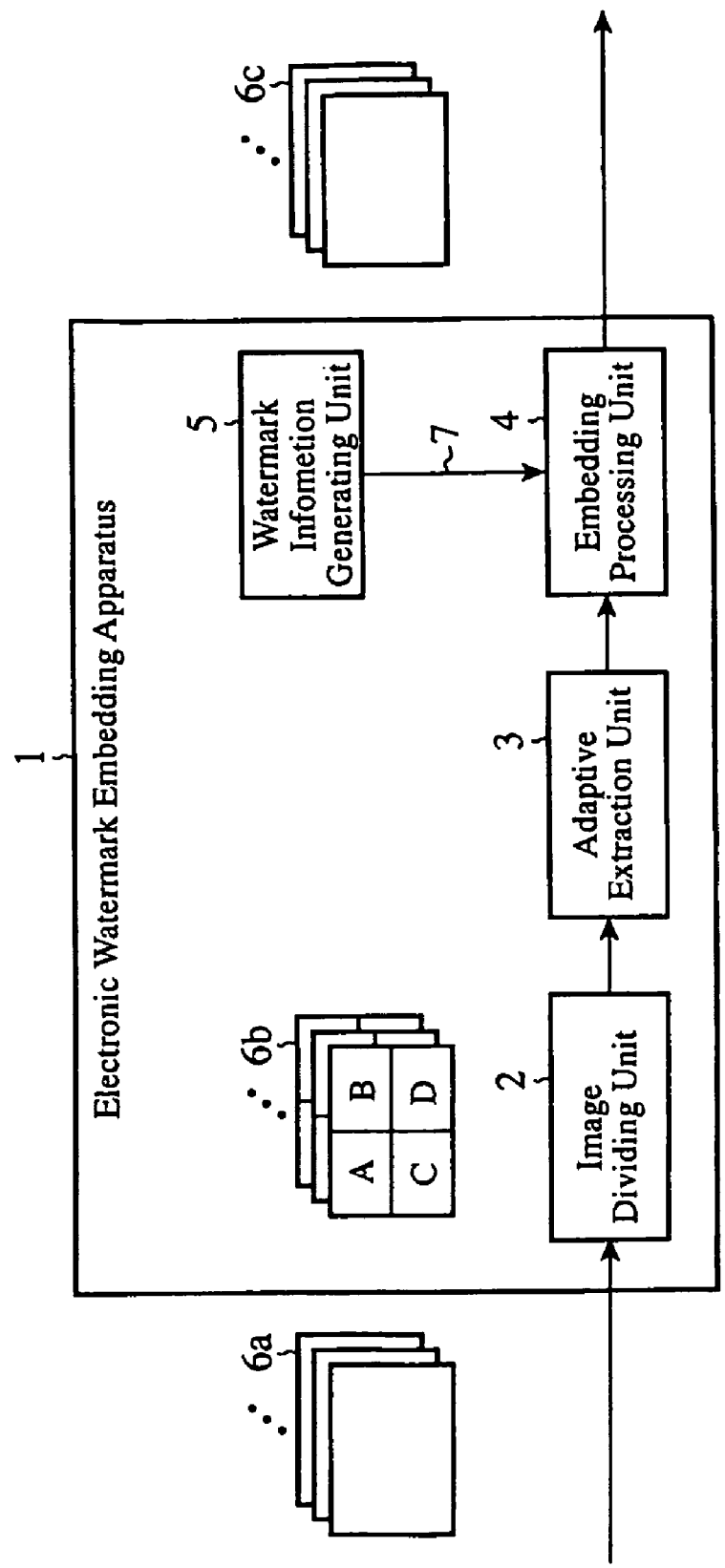
FIG. 1 is a block diagram showing the structure of an electronic watermark embedding apparatus in accordance with embodiment 1 of the present invention.

FIG. 1 is a block diagram showing the structure of an electronic watermark embedding apparatus in accordance with embodiment 1 of the present invention. The electronic watermark embedding apparatus 1 is provided with an image dividing unit 2, an adaptive extraction unit 3, an embedding processing unit 4, and a watermark information generating unit 5. The electronic watermark embedding apparatus 1 can be implemented via execution of an electronic watermark embedding program in accordance with the present invention by using, for example, a general-purpose computer.

In other words, the electronic watermark embedding apparatus 1 can carry out its characteristic data processing by making the computer execute the electronic watermark embedding program and function as the above-mentioned components 2 to 5. In the following explanation, since those skilled in the art can easily recognize the structure and fundamental functions of the computer which embodies the electronic watermark embedding apparatus 1 on the basis of the common general technical knowledge about the field of the present invention, and the structure and fundamental functions of the computer are not directly in connection with the essence of the present invention, the detailed explanation of them will be omitted hereafter.

The image dividing unit 2 spatially divides each frame of an electronic image 6a inputted thereto (in FIG. 1, a moving image which consists of a plurality of frames, and which is referred to as an input electronic image hereafter) into a plurality of regions so as to generate an electronic image 6b. Hereafter, as shown in FIG. 2, a case where the image dividing unit 2 divides each frame image of the input electronic image 6a into four regions will be explained as an example. In FIG. 2, in order to distinguish the divided four regions from one another, they are designated by reference characters A, B, C and D, respectively.

As will be mentioned later, when dividing each frame image of the input electronic image 6a into the four regions, the image dividing unit 2 sets up a guard band (Guard Band) as the boundary of any two of the four divided regions. That is, each frame image of the electronic image 6b is divided into the four regions via guard bands.

The adaptive extraction unit 3 sets up adaptation requirements for specifying pixels whose image quality is not degraded even if their pixel values are made to vary by a predetermined amplitude (i.e., a certain variation), and extracts, as electronic watermark embedding target pixels (referred to as adaptive pixels from here on), pixels which satisfy the adaptation requirements for each of the four divided regions of each frame of the electronic image 6b furnished from the image dividing unit 2.

The embedding processing unit 4 varies the pixel value of each adaptive pixel of the electronic image 6b, which is extracted by the adaptive extraction unit 3, spatially and in a time direction according to electronic watermark information 7 from the watermark information generating unit 5 so as to generate and output an electronic-watermark-embedded electronic image 6c.

In other words, the embedding processing unit performs electronic watermark embedding by specifying a spatial variation to be produced in the pixel values of the adaptive pixels in each of the four divided regions of each frame image of the electronic image 6b and a variation in the time direction (i.e., the direction of frames) to be produced in the spatial variation according to the value of an electronic watermark embedded bit set.

In the following explanation, a case where the embedding processing unit 4 spatially varies the brightness values of the adaptive pixels in each of the four divided regions of each frame image according to the electronic watermark information 7, and also varies them in the time direction (i.e., the direction of frame) will be mentioned as an example, and it is assumed that the adaptive extraction unit 3 sets up adaptation requirements for the brightness levels.

The watermark information generating unit 5 generates the electronic watermark information 7 according to the embedded bit set which constitutes the electronic watermark, and outputs the electronic watermark information to the embedding processing unit 4. The electronic watermark information 7 is the information for specifying a spatial electronic watermark pattern in which the pixel values of the adaptive pixels in each of the four divided regions of each frame image of the electronic image 6b are varied, and a pattern in which the variation is varied in the time direction (i.e., the direction of frames) according to the value of the embedded bit set.

For example, the embedding processing unit 4 sets up the electronic watermark information 7 which causes both spatially embedding of 2-bit information into two diagonal ones of the four divided regions of each frame of the electronic image 6b, and embedding of 2-bit information which provides brightness variations having different phases in the time direction (for example, the brightness variations are about 90 degrees out of phase with each other) to the two diagonal regions, respectively, into the two diagonal regions. By doing in this way, a total of 4-bit electronic watermark which provides a spatial brightness variation and a brightness variation in the time direction to each of the two diagonal regions can be embedded into the electronic image per one frame image.

The embedding processing unit 4 performs the embedding processing so that the spatial brightness values of the adaptive pixels vary slightly in the vicinity of each guard band set up by the image dividing unit 2, and so that the brightness values of the adaptive pixels in the vicinity of the guard band of the same divided region vary slowly in the time direction (i.e., the direction of frames).

FIG. 3 is a diagram showing an example of the electronic watermark pattern in accordance with embodiment 1, and a temporal variation produced in the brightness values of the adaptive pixels in each of the two diagonal regions. FIG. 3(a) shows an example of the electronic watermark pattern containing spatial guard bands, and FIG. 3(b) shows a temporal variation in the pattern shown in FIG. 3 (a) containing time-directional guard bands. In the example of FIG. 3(a), the brightness value of any pixel in the regions B and C shown in FIG. 2 (i.e., portions attached 0 in the figure) is not varied, and the brightness values of all pixels in the regions A and D (i.e., portions attached sign+ in the figure) are varied by +1.

As shown in FIG. 3(a), each spatial guard band GB has a width of 32 pixels, for example. This width has only to be of order which makes it difficult to visually recognize the corresponding boundary of the two regions in which the brightness values of the pixels are varied by different values, respectively. The width is determined properly according to the image characteristics of the target image into which the electronic watermark in accordance with the present invention is to be embedded. In addition, the boundary line on the side of the region B of the guard band GB between the regions B and D is called Ba, and the boundary line on the side of the region D of the guard band GB is called Bb.

For example, the probability of varying the brightness value of a pixel on the boundary line Ba on the side of the region B by +1 is set to $1/33$, while the probability of varying the brightness value of a pixel, outside the boundary line, in the guard band by +1 is gradually raised from $1/33$ as the location of the pixel gets closer to the region D within the guard band GB. Then, the probability of varying the brightness value of a pixel on the boundary line Bb on the side of the region D by +1 is set to $32/33$. By setting the probability of varying the brightness value of each pixel within each guard band in this way, the input electronic image has, as the electronic watermark, guard bands each having a brightness value variation pattern in which variations in the brightness values of pixels in the same line thereof gradually vary from the brightness variation set to one of the corresponding two regions to the brightness variation set to the other one of the corresponding two regions with distance from the one of the corresponding two regions.

Furthermore, in order to vary the brightness value of each pixel in the time direction according to the bit value which constitutes the electronic watermark, for example, the brightness value of each pixel in each of the regions A and D is varied by +1 as long as each pixel is located in any of the first through tenth frames which are numbered from the frame in which the brightness value of each pixel starts being varied, and is varied by a variation which is gradually reduced to 0 as the frame in which each pixel is located changes from the tenth frame to the fifteenth frame, as shown in FIG. 3(b).

In this case, within a time period Bc shown in the figure during which the variation in the brightness value is reduced from +1 to 0, the number of pixels whose brightness value is not varied is increased at a rate of $1/6$ every frame so that the number of pixels whose brightness value is varied by +1 is reduced and the number of pixels whose brightness value is not varied is increased by the reduction in the number of pixels whose brightness value is varied by +1.

Thus, the electronic watermark embedding apparatus 1 in accordance with the present invention makes the brightness values of the pixels in a specific region (i.e., the brightness values of the pixels in a time-directional guard band) vary slowly even in the time direction. Therefore, the present embodiment can prevent the image quality of a recaptured image from degrading due to the embedding of an electronic watermark to the recaptured image.

FIG. 4 is a diagram showing an electronic watermark embedding base containing the spatial guard bands which are embedded into the input electronic image by using the method shown in FIG. 3, and an example of the time-directional guard band. In order to make variations in the brightness values of the pixels in each region easy to understand, every pixel whose brightness value is varied by +1 is shown by a black point and every pixel whose brightness value is not varied is shown by a white point.

As shown in FIG. 4(a), the spatial variations in the brightness values of all the pixels of the electronic image containing the guard bands GB cause the borderlines between the regions A and D and the regions B and C to get blurred.

Furthermore, the time-directional guard band causes, as an electronic watermark, time-varying variations in the brightness values of all the pixels of the electronic image in which the brightness value of each pixel is gradually varied from a previously-set value to a lately-set value with time, as shown in the FIG. 4(b), so that intermediate states are provided.

FIG. 5 is a diagram showing adaptation processing carried out for each embedded bit set, and a temporal variation in each embedded bit set. In the shown example, the adaptive extraction unit 3 extracts adaptive pixels A and B which satisfy adaptation requirements for each of the divided regions of the electronic image 6b. The embedding processing unit 4 varies the brightness values of the adaptive pixels A and B which are extracted by the adaptive extraction unit 3 for each of the divided regions of the electronic image 6b at embedding intervals as shown in the figure (e.g., at intervals of 30 frames) according to the electronic watermark information 7 from the watermark information generating unit 5.

For example, when the embedded bit set of the electronic watermark is "00", the embedding processing unit varies the brightness value of each adaptive pixel A by +1 as long as each adaptive pixel A is located in any of the 1st through 15th frames which are numbered from the frame in which the embedding processing is started, and varies the brightness value of each adaptive pixel B by −1 as long as each adaptive pixel B is located in any of the 16th through 30th frames according to the electronic watermark information 7. In contrast, when the embedded bit set is "01", the embedding processing unit performs processing so as to produce variations in the brightness values of the adaptive pixels which are out of phase with the above-mentioned variations produced in the brightness values of the adaptive pixels.

In order to produce variations in the brightness values of the adaptive pixels in each of the two diagonal ones of the four divided regions as shown in FIG. 2 so that the variations produced in the brightness values of the adaptive pixels in one of the two diagonal regions are out of phase with the variations produced in the brightness values of the adaptive pixels in the other one of the two diagonal regions, the following processing is carried out.

First, when the embedded bit set to be set to each of the regions A and D shown in FIG. 2 is "00", the brightness values of the adaptive pixels A and B extracted from the region A of FIG. 2 are made to vary at intervals corresponding to the embedded bit set 00 shown in FIG. 5, and the brightness values of the adaptive pixels A and B extracted from the region D of FIG. 2 are made to vary at intervals corresponding to an embedded bit set 01 shown in FIG. 5.

When the embedded bit set to be set to each of the regions A and D shown in FIG. 2 is "01", the brightness values of the adaptive pixels A and B extracted from the region A are made to vary at intervals corresponding to the embedded bit set 01 shown in FIG. 5, and the brightness values of the adaptive pixels A and B extracted from the region D are made to vary at intervals corresponding to the embedded bit set 00 shown in FIG. 5, in contrast to the above-mentioned case.

In addition, when the embedded bit set to be set to each of the regions A and D shown in FIG. 2 is "10", the brightness values of the adaptive pixels A and B extracted from the region A are made to vary at intervals corresponding to the embedded bit set 10 shown in FIG. 5, and the brightness values of the adaptive pixels A and B extracted from the region D are made to vary at intervals corresponding to an embedded bit set 11 shown in FIG. 5.

Furthermore, when the embedded bit set to be set to each of the regions A and D shown in FIG. 2 is "11", the brightness values of the adaptive pixels A and B extracted from the region A are made to vary at intervals corresponding to the embedded bit set 11 shown in FIG. 5, and the brightness values of the adaptive pixels A and B extracted from the region D are made to vary at intervals corresponding to the embedded bit set 10 shown in FIG. 5. These processings are also carried out for the regions B and C shown in FIG. 2 in the same way.

In order to produce variations in the brightness values of the adaptive pixels in each of the two diagonal ones of the four divided regions as shown in FIG. 2 so that a variation produced in the brightness values of the adaptive pixels in one of the two diagonal regions is in phase with a variation produced in the brightness values of the adaptive pixels in the other one of the two diagonal regions, when the embedded bit set to be set to each of the regions A and D shown in FIG. 2 is "00", a process of producing brightness variations is carried out for each of the regions A and D of FIG. 2 at intervals corresponding to the embedded bit set 00 in FIG. 5. Also when the embedded bit set is "01", "10", or "11", the process of producing brightness variations is also carried out in the same way.

Next, the operation of the electronic watermark embedding apparatus in accordance with this embodiment of the present invention will be explained.

An input electronic image 6a which is the target into which an electronic watermark is to be embedded is inputted to the image dividing unit 2 disposed in the electronic watermark embedding apparatus 1. The image dividing unit 2 divides the input electronic image 6a into a plurality of regions spatially on a frame-by-frame basis so as to generate an electronic image 6b. As mentioned above, the plurality of divided regions of each frame image of the electronic image 6b are separated by guard bands GB as shown in FIGS. 3 and 4 which serve as boundaries of the plurality of divided regions.

The adaptive extraction unit 3 accepts the electronic image 6b from the image dividing unit 2, and extracts adaptive pixels A and B for each of the plurality of divided regions of each frame image on the basis of adaptation requirements about the brightness levels of pixels as shown in, for example, FIG. 6.

FIG. 6 is a diagram showing adaptation processing with a certain brightness level being set to each embedded bit set, and, in this figure, intervals for embedding corresponding to each embedded bit set are the same as those shown in FIG. 5. As shown in the figure, pixels having a brightness value of 180 or more are extracted as adaptive pixels B. Pixels having a brightness value of 129 or more and pixels Next 50% having a brightness value of 128 or less are extracted as adaptive pixels A. Pixels Next 50% having a brightness value of 128 or less are pixels which are the higher-ranked half of all pixels having a brightness value of 128 or less.

As an alternative, only when the input electronic image does not have a sufficient number of pixels having a brightness value of 129 or more, and a sufficient amount of embedding for detection of the electronic watermark is not provided, pixels Next 50% having a brightness value of 128 or less can be extracted as adaptive pixels A.

From the viewpoint of the characteristics of human being's visual sense, the lower brightness the image has and hence the darker the image is, the more easily variations in the brightness value can be recognized visually. Therefore, the reference brightness value of 128 which is used for extracting the above-mentioned adaptive pixels is determined, as a minimum brightness value at which variations in the brightness of the image cannot be recognized visually, on the basis of examination experiments in consideration of the Weber-Fechner law etc.

The adaptive extraction unit 3 extracts the adaptive pixels A and B which satisfy the adaptation requirements about the above-mentioned brightness level for each of the plurality of divided regions of the electronic image 6b, and outputs information which specifies these pixels (e.g., the position coordinates of each of the adaptive pixels on the image) to the embedding processing unit 4.

The embedding processing unit 4 performs the process of producing a brightness variation in each of the adaptive pixels A and B, which are extracted for each of the plurality of divided regions of the electronic image 6b according to the information from the adaptive extraction unit 3, according to the electronic watermark information 7 from the watermark information generating unit 5 at the embedding intervals shown in FIG. 5.

For example, when the embedded bit set acquired from the watermark information generating unit 5 is "00", the embedding processing unit 4 varies the brightness value of each adaptive pixel A by +1 as long as each adaptive pixel A is located in any of the 1st through 15th frames which are numbered from the frame in which the embedding processing is started, and varies the brightness value of each adaptive pixel B by −1 as long as each adaptive pixel B is located in any of the 16th through 30th frames, as mentioned above with reference to FIG. 5.

In FIG. 5, for the sake of simplicity, the time period Bc (i.e., the time-directional guard band) as shown in FIG. 3(b) is not disposed. However, when there is no visual influence due to the modulation of the pixel values with respect to the time direction, such a time-directional guard band can be disposed.

When the visual influence due to the embedding of the electronic watermark is taken into consideration, it is desirable that variations in the brightness values of the adaptive pixels fall within a range of ±1. However, for adaptive pixels which have a sufficient brightness value and which prevent visual recognition of influence due to the brightness modulation (e.g., adaptive pixels having a brightness value of 190 or more), the variations in the brightness value associated with the electronic watermark embedding are doubled (±2) so that the embedding strength of the electronic watermark can be increased.

When the input electronic image does not have a sufficient number of pixels having a brightness value of 129 or more, and a sufficient amount of embedding for detection of the electronic watermark is not provided, the adaptive extraction unit 3 can be so constructed as to extract pixels having a brightness value larger than the mean value of the brightness values of pixels having a brightness value of 128 or less.

The embedding processing unit 4 performs the embedding processing so that there cause slightly-varying variations in the brightness values of adjacent pixels in each guard band between two adjacent regions, which is set up by the image dividing unit 2 as mentioned above. Furthermore, when a time-directional guard band is set up, the embedding processing unit performs the embedding processing so that there cause a slowly-varying variation in the brightness value of each pixel in the time-directional guard band with respect to the time direction.

A scene change in a video image is a significant event which causes a correlation between frame images or field images to vary notably with respect to the time direction, and which can serve as a synchronization reference of the embedding processing. Therefore, the embedding processing unit 4 in accordance with this embodiment can perform the electronic watermark embedding processing in synchronization with a scene change of the target electronic image.

In this case, the embedding processing unit 4 detects, as a scene change, any change with respect to the time direction of the correlation between frame images in the target image into which the electronic watermark is to be embedded which exceeds a predetermined threshold, for example. The embedding processing unit 4 performs the process of producing brightness variations with respect to the above-mentioned time direction on frames starting from the frame in which the scene change has been detected.

As a result, even if the process of producing brightness variations with respect to the time direction in the electronic watermark embedding processing is shifted in time from the embedding intervals dependent upon the electronic watermark information 7, the synchronization of the brightness variations process with the above-mentioned intervals can be recovered on the basis of any scene change in the target image. Furthermore, when detecting the electronic watermark in accordance with the present invention, the phase in the embedding pattern of the electronic watermark can be restored exactly.

When completing the brightness variation producing process dependent upon the electronic watermark information 7 furnished from the watermark information generating unit 5, as mentioned above, the embedding processing unit 4 outputs the thus-acquired image as an electronic-watermark-embedded image 6c.

As mentioned above, in accordance with this embodiment 1, the electronic watermark embedding apparatus extracts, as adaptive pixels, every pixel whose image quality is not degraded even if its pixel value (e.g., brightness value) is made to vary by a predetermined amplitude (i.e., a certain variation) from a target image, and sets up guard bands which make the variations in the pixel values of the adaptive pixels slightly vary in space and slowly vary in a time direction. Therefore, while the resistance of the electronic watermark to recapturing of the target image to which the electronic watermark is embedded is maintained, visual disturbance due to the embedding of the electronic watermark can be remarkably reduced.

In above-mentioned embodiment 1, an example of performing the process of producing a variation in the brightness value of each adaptive pixel both in space and in the time direction to embed an electronic watermark into a target image is shown. As an alternative, another pixel value which can be detected from any recaptured image can be used, instead of the brightness value.

Embodiment 2

In above-mentioned embodiment 1, there is provided an example of extracting adaptive pixels having a brightness value of 128 or more which corresponds to a brightness level at which the image quality of a target image does not degrade even if a process of producing brightness variations is performed on the adaptive pixels from the target image. However, there are cases where the extraction of only these adaptive-pixels does not provide an adequate amount of embedding and therefore no electronic watermark can be detected.

It is expected that there are many cases where in the target image into which the electronic watermark is to be embedded, pixels each having a large pixel value variation between frame images (or field images) form a frame image having abrupt movements of objects, and therefore pixel value variations have little visual influence upon such pixels.

An electronic watermark embedding apparatus in accordance with embodiment 2 detects pixels each having a large pixel value variation between frame images (or field images) from frame difference values (or field difference values), and selects them as adaptive pixels to which an electronic watermark is to be embedded.

The electronic watermark embedding device in accordance with embodiment 2 fundamentally has the same structure as that according to above-mentioned embodiment 1, but differs from that according to above-mentioned embodiment 1 in that an adaptive extraction unit 3 and an embedding processing unit 4 thereof perform the above-mentioned adaptation processing on a target image using frame difference values.

Next, the adaptation processing using frame difference values will be explained in detail.

Figure 7:
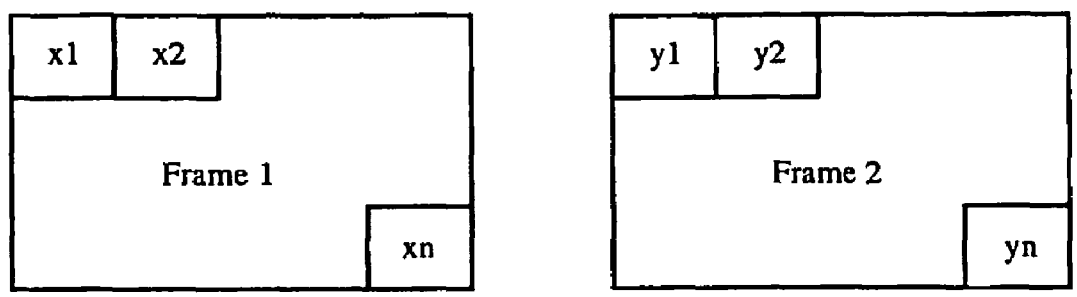
FIG. 7 is a diagram explaining a method of calculating a frame difference which an electronic watermark embedding apparatus in accordance with embodiment 2 uses.

FIG. 7 is a diagram showing a method of calculating frame difference values which the electronic watermark embedding apparatus in accordance with embodiment 2 of the present invention uses. In the figure, frames 1 and 2 denote frame images of an electronic image 6b which are inputted in time sequence. When the pixels which constitute the frame 1 have values (e.g., brightness values) of x1, x2, . . . , and xn, respectively, and the pixels which constitute the frame 2 have values of y1, y2, . . . , and yn, respectively, each pixels frame difference value $\Delta F(n)$ can be calculated, as an absolute value, using the following equation (1):

$$\Delta F(n)=|xn-yn| \tag{1}$$

FIG. 8 is a diagram showing the adaptation processing using frame difference values which is done for each embedded bit set in accordance with embodiment 2, and it is assumed that embedding intervals corresponding to each embedded bit set (in the shown example, each of "00" and "01") are the same as those shown in FIG. 5. The adaptive extraction unit 3 extracts, as adaptive pixels B, pixels having a brightness values of 180 or more, and also extracts, as adaptive pixels A, pixels having a brightness value of less than 128, as well as pixels having a brightness values of 128 or more, unlike that of above-mentioned embodiment 1.

Pixels Next 50% having a brightness value of less than 128 are pixels which are the higher-ranked half of all pixels having a brightness value of less than 128. Remainder having a brightness value of less than 128 are pixels having a brightness value lower than those of the pixels Next 50% having a brightness value of less than 128.

The adaptive extraction unit 3 performs the same processing as that of above-mentioned embodiment 1 so as to extract adaptive pixels A and B respectively having brightness levels shown in FIG. 8 for each of the plurality of divided regions of the electronic image 6b. The adaptive extraction unit 3 further calculates a frame difference value between frames of the electronic image 6b which are inputted in time sequence for every pixel using the above-mentioned equation (1), and outputs the calculated result which is obtained for every pixel to the embedding processing unit 4, as well as information for specifying the adaptive pixels (e.g., the position coordinates of the adaptive pixels in the target image).

The embedding processing unit 4 determines a variation which is to be applied to the brightness value of each adaptive pixel on the basis of the frame difference value and brightness level of each adaptive pixel, and performs embedding processing on each adaptive pixel. Referring now to the example of FIG. 8, the embedding processing unit 4 recognizes every pixel whose frame difference value calculated by the adaptive extraction unit 3 is two or less to be a pixel having a small pixel variation between frames (i.e., a pixel having a small amount of movement). Among such adaptive pixels having a frame difference value of two or less, only pixels having a brightness value of 128 or more at which variations in the brightness cannot be recognized visually even if the process of producing brightness variations is performed thereon are varied in their brightness values.

The embedding processing unit 4 also recognizes every pixel whose frame difference value calculated by the adaptive extraction unit 3 is equal to or larger than 3 and is equal to or smaller than 7 to be a pixel having a middle pixel variation between frames, and performs the brightness variation producing process on adaptive pixels which are the pixels Next 50% having a brightness value of less than 128, as well as on adaptive pixels having a brightness value of 128 or more.

Furthermore, the embedding processing unit 4 recognizes every pixel whose frame difference value calculated by the adaptive extraction unit is equal to or larger than 8 to be a pixel having a large pixel variation between frames (i.e., a pixel having a large amount of movement). The embedding processing unit 4 then determines that such adaptive pixels having a frame difference value of 8 or more are pixels in which variations in the brightness cannot be recognized visually even if the process of producing brightness variations is performed thereon, and performs the brightness variation producing process on even adaptive pixels having a brightness value of less than 128.

Proper values of the above-mentioned thresholds used for classifying frame difference values can be set to the embedding processing unit 4 according to the image quality of the electronic-watermark-embedded image 6c.

As mentioned above, the electronic watermark embedding apparatus in accordance with this embodiment 2 carries out embedding of an electronic watermark into a target image according to frame difference values. Therefore, the electronic watermark embedding apparatus in accordance with this embodiment can extract, as adaptive pixels, pixels each having a large pixel value variation between frames and having a property of being difficult to visually recognize variations in the pixel value thereof, and can increase the amount of embedding of the electronic watermark. Thereby, the resistance of the electronic watermark in accordance with the present invention to recapturing of the target image can be improved.

In above-mentioned embodiment 2, field difference values can be used instead of frame difference values. This variant can offer the same advantage with the same structure fundamentally.

Embodiment 3

An electronic watermark embedding apparatus in accordance with this embodiment 3 selects, as adaptive pixels for embedding of an electronic watermark, pixels at an edge portion of a target image into which the electronic watermark is to be embedded in order to increase the amount of embedding of the electronic watermark.

The electronic watermark embedding device in accordance with embodiment 3 fundamentally has the same structure as that according to above-mentioned embodiment 1, but differs from that according to above-mentioned embodiment 1 in that an adaptive extraction unit 3 and an embedding processing unit 4 thereof perform edge adaptation processing on the target image.

Next, the selection of adaptive pixels in the edge adaptation processing will be explained.

First, the adaptive extraction unit 3 performs perpendicular edge filter processing, isolated-point removing processing, and three-point NAM processing on an electronic image 6b into which an electronic watermark is embedded through the processing shown in above-mentioned embodiment 1 or 2 so as to acquire an image in which an edge portion is emphasized.

FIG. 9 is a diagram explaining the edge adaptation processing of the electronic watermark embedding apparatus in accordance with embodiment 3, FIG. 9(a) shows the perpendicular edge filter processing, FIG. 9(b) shows the isolated-point removing processing, and FIG. 9(c) shows the three-point NAM processing. Each of the perpendicular edge filter processing, isolated-point removing processing, and three-point NAM processing will be explained with reference to these figures. In FIG. 9, a case where the image (i.e., the electronic image 6b) on which each processing is to be performed has an image size of 720×486 pixels is taken as an example.

In the perpendicular edge filter processing, a perpendicular edge is emphasized with noted pixels in the target image on which the processing is to be performed, and pixels adjacent to the noted pixels. The adaptive extraction unit calculates a pixel value Ya(x, y) in which the perpendicular edge with the noted pixels (each having coordinates (x, y)) is emphasized using the following equation (2):

$$Ya(x,y)=|-Y(xp,y)/2+Y(x,y)-Y(xn,y)/2 \quad (2)$$

In the case of 0<=x<719 and 0<=y<485,
xp=x−1, xn=x+1
In the case of x=0
xp=x+1, xn=x+1
In the case of x=719
xp=x−1, xn=x−1

The adaptive extraction unit 3 performs the isolated-point removing processing on the target image on which it has already performed the above-mentioned processing to emphasize the perpendicular edge with the noted pixels so that any sudden pixel value variation cannot be recognized as an edge. In the shown example, the adaptive extraction unit acquires the pixel values of 8 pixels in the vicinity of each noted pixel (having a pixel value Ya(x, y)), and removes, as an isolated point (having a pixel value Yb(x, y)), a pixel which provides a minimum of the third largest pixel value maxYa of the pixel values of the eight adjacent pixels, and the pixel value Ya(x, y) of each noted pixel according to the following equation (3):

$$Yb(x,y)=\min(Ya(x,y),\max Ya) \quad (3)$$

xp=x−1, xn=x+1, yp=y−1, yn=y+1
In the case of x=0
xp=x+1, xn=x+1
In the case of x=719
xp=x−1, xn=x−1
In the case of y=0
yp=y+1, yn=y+1
In the case of y=485
yp=y−1, yn=y−1 where maxYa shows the third largest pixel value of the pixel values of the adjacent pixels (i.e., the eight adjacent pixels) which do not include each noted pixel itself, and is expressed by the following equation (4):

$$\max Ya=Mth(Ya(xp,yp),Ya(x,yp),Ya(xn,yp),Ya(xp,y),Ya(xn,y),Ya(xp,yn),Ya(x,yn),Ya(xn,yn)) \quad (4)$$

The Mth function is the function which returns the third largest value of all input values.

Then, the adaptive extraction unit 3 performs the three-point NAM processing on the image in which the perpendicular edge is emphasized and on which the isolated-point removing processing is performed. To be more specific, the adaptive extraction unit acquires a degree of edge Yc(x, y) which becomes a large value when the noted pixels are located at the edge portion of the image from each noted pixel (having coordinates (x, y)) associated with the edge portion and two pixels adjacent to each noted pixel using the following equation (5). This three-point NAM processing is also edge enhancement processing, and, when assuming Yc(x, y) as an image, while it is an edge-enhanced image, that Yc(x, y) is large becomes an index indicating that each noted pixel located at the coordinates (x, y) has a strong property of being an edge portion.

$$Yc(x,y)=\max(Yb(xp,y),Yb(x,y),Yb(xn,y)) \quad (5)$$

xp=x−1, xn=x+1
In the case of x=0
xp=x+1
In the case of x=719
xp=x−1

The adaptive extraction unit 3 extracts pixels having a predetermined degree or more of edge (Yc) (e.g., Yc>=10) from among pixels which constitute the edge in the image on which the edge adaptation processing is performed as mentioned above, and acquires information for specifying the extracted pixels (e.g., the position coordinates of these pixels in the image).

The adaptive extraction unit 3 then extracts original images A and B on which the edge adaptation processing has not been performed yet from the electronic image 6b (i.e., extracts adaptive pixels which satisfy adaptation requirements about the predetermined degree of edge from the electronic image 6b), and outputs information for specifying the pixels (e.g., the position coordinates of these pixels in the image) to the embedding processing unit 4.

The embedding processing unit 4 performs the brightness variation producing process on the adaptive pixels of the electronic image 6b which are the original images according to the information for specifying both pixels having a degree of edge equal to or larger than the predetermined degree of edge at the edge portion and adaptive pixels from the adaptive extraction unit 3 at the embedding intervals shown in FIG. 5.

Figures 10, 11:
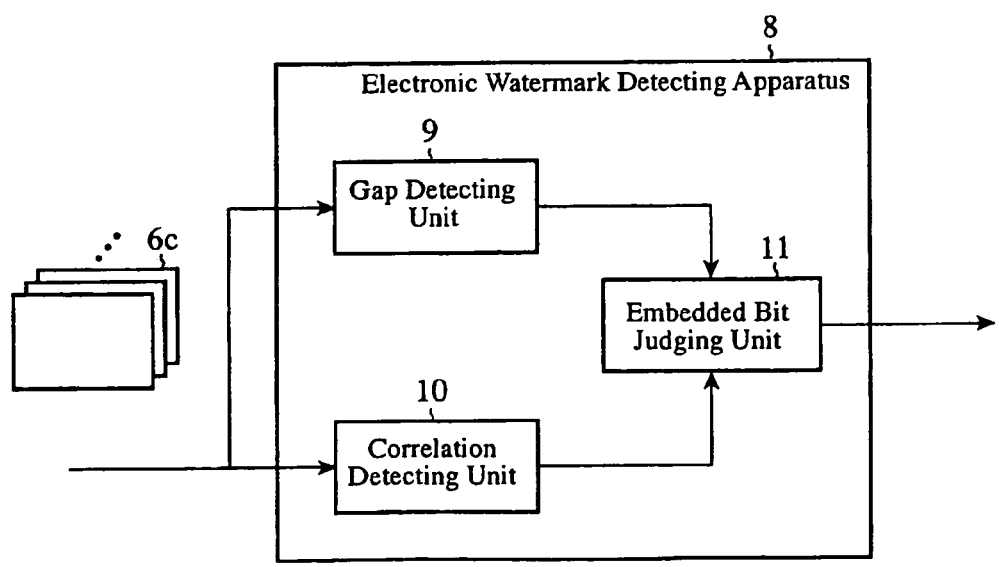
FIG. 10 is a diagram showing the edge adaptation processing done for each embedded bit set.
FIG. 11 is a block diagram showing the structure of an electronic watermark detecting apparatus in accordance with embodiment 4 of the present invention.

FIG. 10 is a diagram showing the edge adaptation processing which is done for each embedded bit set. The above-mentioned processing will be explained by referring to the shown example. The adaptive extraction unit 3 extracts pixels having a degree of edge of 10 or more from all the pixels which are included in the image on which the edge adaptation processing has been performed and which constitute an edge, and acquires information for specifying the extracted pixels (e.g., the position coordinates of these pixels). The adaptive extraction unit further extracts, as adaptive pixels, both pixels having a brightness value of 128 or more and pixels having a brightness value of 180 or more from the electronic image 6b which is the original image, and acquires information for specifying the extracted pixels (e.g., the position coordinates of these pixels). These pieces of information are outputted to the embedding processing unit 4.

The embedding processing unit 4 then increases the amount of variations in the adaptation processing for either adaptation A or adaptation B, as shown in FIG. 10. In other words, for the adaptation A, the embedding processing unit increments the variation to be applied to the brightness value of each adaptive pixel having a degree of edge of 10 or more at the edge portion selected from the image on which the edge adaptation processing has been performed and having a brightness value of 128 or more by 1. In addition to the processing for the adaptation A, the embedding processing unit increments the variation to be applied to the brightness value of each adaptive pixel having a brightness value of 180 or more by 1 for the adaptation B. While variations can be applied to the brightness of the target image through the processing for the adaptation A, the addition of the processing for the adaptation B makes it possible to produce more solid variations in the brightness of the target image without increase in the visual disturbance, and to provide stable results of detection of the electronic watermark embedded into the target image.

As mentioned above, the electronic watermark embedding apparatus in accordance with this embodiment 3 further extracts, as adaptive pixels, pixels located at an edge portion and having a degree of edge equal to or greater than a predetermined degree of edge from the electronic image 6c into which an electronic watermark is embedded through the processing shown in embodiment 1 or 2, and further embeds an electronic watermark into the electronic image. Therefore, the electronic watermark embedding apparatus in accordance with this embodiment can increase the amount of watermark embedding, and can improve the resistance of the electronic watermark to recapturing of the target image.

In above-mentioned embodiments 1 to 3, different types of adaptation processing are explained. As an alternative, a combination of two or more of the different types of adaptation processing can be carried out.

Embodiment 4

FIG. 11 is a block diagram showing the structure of an electronic watermark detecting apparatus in accordance with embodiment 4 of the present invention. The electronic watermark detecting apparatus 8 is provided with a Gap detecting unit 9, a correlation detecting unit 10, and an embedded bit judging unit 11. The electronic watermark detecting apparatus 8 can be implemented via execution of an electronic watermark detecting program in accordance with the present invention by using, for example, a general-purpose computer.

In other words, the electronic watermark detecting apparatus 8 can carry out its characteristic data processing by making the computer execute the electronic watermark detecting program and function as the above-mentioned components 9 to 11. In the following explanation, the detailed explanation of the structure and fundamental functions of the computer which implements the electronic watermark detecting apparatus 8 will be omitted hereafter for the same reason explained in above-mentioned embodiment 1.

In an electronic image 6c into which an electronic watermark is embedded by the electronic watermark embedding apparatus 1 explained in any of above-mentioned embodiments 1 to 3, frame difference values (or field difference values) vary rapidly when the phase of variations with respect to a time direction in the electronic watermark pattern is inverted.

Therefore, if recognizing the electronic watermark embedded into the electronic image 6c, by detecting a frame difference (or a field difference) from the electronic image 6c periodically at the time when the phase of variations with respect to the time direction in the electronic watermark pattern is inverted, the electronic watermark detecting apparatus can restore the electronic watermark pattern in accordance with the present invention on the basis of the frame difference value (or field difference value).

The Gap detecting unit 9 detects variations (referred to as a Gap hereafter) with respect to the time direction in the pixel values of pixels in the electronic watermark pattern from the electronic image 6c for each of the plurality of divided regions on the basis of the detection of the above-mentioned periodic frame difference. The correlation detecting unit 10 also detects a correlation between pixel value variations with respect to the time direction in the electronic watermark pattern which is embedded into the electronic image by the electronic watermark embedding apparatus 1 explained in any of above-mentioned embodiments 1 to 3 and the pixel value variations with respect to the time direction of the electronic image 6c for each of the plurality of divided regions.

The embedded bit judging unit 11 determines the bit value embedded into the electronic image 6c on the basis of the Gap value detected by the Gap detecting unit 9, and also determines the bit value embedded into the electronic image 6c on the basis of the correlation value detected by the correlation detecting unit 10, and outputs, as the embedded bit set, the bit value which it has determined finally by judging both the determination results comprehensively.

Next, the operation of the electronic watermark detecting apparatus in accordance with this embodiment of the present invention will be explained.

In the following explanation, it is assumed that the electronic watermark detecting apparatus detects the above-mentioned embedded bit set which constitutes the electronic watermark from the electronic image 6c in which the electronic watermark is embedded into an input electronic image 6a by the electronic watermark embedding apparatus 1 mentioned in any of above-mentioned embodiments.

As the electronic image 6c, there is provided an electronic image including an electronic watermark pattern in which the brightness values of adaptive pixels included in two diagonal ones (e.g., regions A and D or regions B and C in FIG. 2) of four regions into which each frame image of the input electronic image 6a is divided are made to vary out of phase with the variations applied to those of adaptive pixels included in the other two diagonal regions according to electronic watermark information 7, the electronic watermark pattern also varying in a time direction (i.e., a direction of frames).

Furthermore, assume that a bit value 00 is embedded into each of the diagonal regions A and D at intervals shown in FIG. 5. That is, the brightness values of the adaptive pixels in the region A are varied at the intervals corresponding to the embedded bit set 00 shown in FIG. 5, while the brightness values of the adaptive pixels in the region D are varied at the intervals corresponding to the embedded bit set 01 shown in FIG. 5.

The electronic image 6c which is a moving image from which an electronic watermark is to be detected is played back by a display (or monitor), and an image obtained by recapturing this displayed electronic image using a video camera is furnished to the electronic watermark detecting apparatus 8. The electronic image 6c is furnished to both the Gap detecting unit 9 and the correlation detecting unit 10 disposed in the electronic watermark detecting apparatus 8.

Gap detection intervals are set to the Gap detecting unit 9 on the basis of the electronic-watermark-embedding intervals for the electronic image 6c, and the Gap detecting unit 9 calculates a frame brightness difference (i.e., carries out a Gap detection) for each of the plurality of divided regions of the electronic image 6c at the Gap detection intervals.

FIG. 12 is a diagram showing an example of the Gap detection intervals for the intervals for embedding of the electronic watermark (e.g., intervals of 30 frames), and shows, as an example, a case where the electronic watermark is embedded into the target image at the embedding intervals of FIG. 5 shown in above-mentioned embodiment 1. In the example shown in the figure, Gaps are detected at a time a when an 8th frame is started after a 7th frame is completed, at a time b when a 16th frame is started after a 15th frame is completed, at a time c when a 23rd frame is started after a 22nd frame is completed, and at a time d when a 30th frame is started.

Each of the times a and c corresponds to a point at which a phase change occurs for the embedding intervals associated with the embedded bit sets 10 and 11 shown in FIG. 5, and each of the times b and d corresponds to a point at which a phase change occurs for the embedding intervals associated with the embedded bit sets 00 and 01 shown in FIG. 5.

When the electronic watermark is embedded into the target image in synchronization with a scene change of the electronic image 6*c* at which the image correlation in the direction of frames changes remarkably, the Gap detecting unit 9 grasps a start point of the embedding intervals with the scene change, and performs Gap detection processing, as in the case of above-mentioned embodiment 1.

In this case, the Gap detecting unit 9 detects, as a scene change, a point where the amount of variations with time in the image correlation in the direction of frames of the target moving image from which an electronic watermark is to be detected exceeds a predetermined threshold, for example. The Gap detecting unit 9 then performs the detection of Gaps on subsequent frames that follow the frame in which the scene change has been detected thereby.

Within several seconds (e.g., 2 to 3 seconds) after a scene change has occurred, the image quality of recaptured data which is to be taken in as the electronic image 6*c* can be varied greatly. This is because the brightness values of about 30 subsequent frames following a frame in which a scene change has occurred vary greatly due to, for example, the auto iris functions of the video camera.

Therefore, when performing the detection of Gaps in synchronization with a scene change which has occurred in the electronic image 6*c*, the Gap detecting unit 9 does not use 30 subsequent frames following the frame in which the scene change has occurred, but uses recaptured data about frames following the 30 frames, in which their brightness values are stable, for example.

As a result, even if the Gap detection process in the electronic watermark detection processing is carried out at a timing which is shifted from the initially-set Gap detection intervals, the synchronization of the Gap detection process with the above-mentioned initially-set Gap detection intervals can be recovered on the basis of detection of any scene change which has occurred in the target image.

Next, the details of the Gap detection processing will be explained.

The Gap detecting unit 9 calculates, as a Gap value, the difference between the average of the brightness values of all the pixels in a frame immediately before each Gap detection time and that of the brightness values of all the pixels in a frame immediately after each Gap detection time (the difference between the average of the brightness values of all the pixels in a frame immediately before each change in the embedding phase of the electronic watermark pattern and that of the brightness values of all the pixels in a frame immediately after each change in the embedding phase of the electronic watermark pattern) for each of the plurality of divided regions of the inputted electronic image 6*c* at the time of watermark embedding according to the following equation (6):

$$\text{Gap}(i) = Y(15xi+16) - Y(15xi+15) - \alpha \quad (6)$$

$\alpha = (Y(15xi+15) - Y(15xi+14) + Y(15xi+17) - Y(15xi+16))/2$ where Y(n) shows the average of the brightness values of all the pixels in an n-th field.

Since the first 30 frames which are recaptured at the start of the recapturing are disregarded, i is given by 4, 5, 6, and Y(44), Y(45), Y(46), Y(47), Y(59), Y(60), Y(61), Y(62), Y(74), Y(75), Y(76), Y(77), and . . . appear as Y(n).

In this way, the Gap detecting unit 9 calculates a Gap value at each Gap detection time at the above-mentioned embedding intervals corresponding to the embedded bit set which constitutes the electronic watermark for each of the plurality of divided regions of the electronic image 6*c* at the time of watermark embedding. When completing the calculation of these Gap values, the Gap detecting unit 9 calculates the average of the Gap values at each of the Gap detection times a to d acquired at the predetermined intervals for each of the plurality of divided regions A to D. For example, the Gap detecting unit acquires the average of the Gap values acquired at the Gap detection times a in the region A using the following equation (7):

[Equation 1]

$$AGap_a = \frac{1}{n}\sum_{i=1}^{n} a(i) \quad (7)$$

In this equation, n is a natural number, and a(1), a(2), a(3), . . . , a(n) show the Gap values respectively calculated at the Gap detection times a within the embedding time intervals. The Gap detecting unit also calculates the average of the Gap values at each of the Gap detection times a to d acquired at the predetermined intervals for each of the plurality of divided regions B to D using a similar equation. In the above equation, A in $AGap_a$ shows the region A of the four divided regions of the electronic image 6*c* at the time of the watermark embedding, and the subscript a in $AGap_a$ shows the Gap detection time a.

When calculating the average of the Gap values at each of the Gap detection times acquired at the predetermined intervals for each of the four divided regions of the electronic image 6*c* at the time of the watermark embedding, the Gap detecting unit 9 calculates Gap values ($A_{AD}Gap_{ac}$, $A_{AD}Gap_{bd}$, $A_{BC}Gap_{ac}$, and $A_{BC}Gap_{bd}$) for the two sets of the two diagonal regions (the regions A and D, and the regions B and C) according to the following equation (8) since the variation produced in the brightness value of each adaptive pixel in one of the two diagonal regions is out of phase with the variation produced in the brightness value of each adaptive pixel in the other one of the two diagonal regions, where $A_{AD}$ shows the regions A and D and $A_{BC}$ shows the regions B and C.

$$A_{AD}Gap_{ac} = (AGap_a + AGap_c - DGap_a - DGap_c)/4$$

$$A_{AD}Gap_{bd} = (AGap_b + AGap_d - DGap_b - DGap_d)/4$$

$$A_{BC}Gap_{ac} = (BGap_a + BGap_c - CGap_a - CGap_c)/4$$

$$A_{BC}Gap_{bd} = (BGap_b + BGap_d - CGap_b - CGap_d)/4 \quad (8)$$

When the variation applied to the brightness value of each adaptive pixel in one of the two diagonal regions is made to be in phase with the variation applied to the brightness value of each adaptive pixel in the other one of the two diagonal regions, the user can recognize visually that the whole of the electronic image becomes bright or dark periodically according to the variations in the brightness of the entire screen. In contrast, when the variation applied to the brightness value of each adaptive pixel in one of the two diagonal regions is made to be out of phase with the variation applied to the brightness value of each adaptive pixel in the other one of the two diagonal regions, as mentioned above, the variations in the brightness of the entire screen can be cancelled.

$Gap_{ac}$ and $Gap_{bd}$ which are thus acquired are outputted from the Gap detecting unit 9 to the embedded bit judgment unit 11. The embedded bit judgment unit 11 carries out determination of the embedded bit set which is based on the Gap detection results using the Gap values ($Gap_{ac}$ and $Gap_{bd}$) furnished from the Gap detecting unit 9.

FIG. 13 is a diagram showing a relationship between the Gap values and the embedded bit set. The embedded bit judgment unit 11 determines the embedded bit set according to the relationship shown in this figure. Parameters x and z shown in the figure are acquired by the embedded bit judgment unit 11 using the Gap values ($Gap_{ac}$ and $Gap_{bd}$) calculated by the Gap detecting unit 9.

In the figure, x is equal to max ($|Gap_{ac}|$, $|Gap_{bd}|$) which shows the absolute value of a larger one of $Gap_{ac}$ and $Gap_{bd}$ which can be a candidate for a significant value. On the other hand, z shows the other one of Gapac and Gapbd which has a value close to 0, i.e., which cannot be a candidate for the significant value.

The embedded bit judgment unit 11 determines the embedded bit set by determining which relationship shown by the parameters x and z of FIG. 13 $Gap_{ac}$ and $Gap_{bd}$ have.

Next, the embedded bit set determination using correlation detection will be explained.

FIG. 14 is a diagram showing the embedding phase of the electronic watermark, and shows the phases of variations applied to the brightness values of adaptive pixels in the case of the embedding intervals shown in FIG. 5. Functions $f^I(i)$ and $f^Q(i)$ which specify the above-mentioned embedding phases are set to the correlation detecting unit 10. Using these functions, variations in the time direction (i.e., the direction of frames) in the electronic watermark pattern of the target image from which the electronic watermark is to be detected are grasped.

The function $f^I(i)$ specifies the phase for the embedding intervals corresponding to each of the embedded bit sets 00 and 01 shown in FIG. 5, and is referred to as I-phase from here on, while the function $f^Q(i)$ specifies the phase for the embedding intervals corresponding to each of the embedded bit sets 10 and 11 shown in FIG. 5, and is referred to as Q-phase from here on.

The correlation detecting unit 10 acquires reference image data α, which is used to calculate the correlation using the following equation (9), from the electronic image 6c furnished thereto. This reference image data α shows the average of the brightness values of 60 fields inputted immediately before noted fields (i.e., fields at which the correlation is detected) starting from a field at which the detection of the correlation of the electronic image 6c is started and ending at a last field (i.e., an N-th field) of the image from which the electronic watermark is to be detected. Yj shows the average of the brightness values of all the pixels of each field of the electronic image 6c.

[Equation 2]

$$\alpha = \frac{1}{60} \sum_{j=i-60}^{i} Y_j \quad (9)$$

$i = 61, 62, 63, \ldots,$ $N$ (when electronic image consists of $N$ fields)

Thus, when acquiring the reference image, the correlation detecting unit in accordance with the present invention uses the average of the brightness values of all the pixels of frames (or fields) in the vicinity of the frames (or fields) at which the correlation is detected. The reason why the average of the brightness values of all the pixels of frames in the vicinity of the noted frames at which the correlation is detected is used to acquire the reference image is that in general, frames in the vicinity of the noted frames are similar to one another, and therefore the calculation of the average of the brightness values of the frame images can reduce the influence caused by the difference among the contents of the frame images and the reference image which approximates the noted frames more accurately can be acquired.

Instead of the average of the brightness values of all the pixels of above-mentioned 60 fields inputted immediately before the frames at which the correlation is detected, the correlation detecting unit can adopt the following equation (10) or (11) to acquire the reference image data α. The following equation (10) is the one used for calculating the average of the brightness values of N fields when the electronic image 6c includes the N fields, and the following equation (11) is the one used for calculating the average of the brightness values of 28 fields inputted immediately before the noted fields and 30 fields inputted immediately after the noted fields.

[Equation 3]

$$\alpha = \frac{1}{N} \sum_{j=1}^{N} Y_j \quad (10)$$

when electronic image consists of $N$ fields $$\alpha = \frac{1}{58} \sum_{j=i-28}^{i+30} Y_j \quad (11)$$

$i = 29, 30, 31, \ldots,$ $N - 30$ (when electronic image consists of $N$ fields)

Then, the correlation detection unit 10 calculates the correlation value corresponding to the embedding phase for each of the plurality of divided regions of the electronic image 6c at the time of the watermark embedding using both the functions $f^I(i)$ and $f^Q(i)$ which specify the phases for the embedding intervals shown in FIG. 5, and the reference image data α, according to the following equations (12) and (13). In the following equations, i=a shows an initial value of a field number which enables the calculation of the reference image data α, and Yi shows the average of the brightness values of all the pixels of each field of the electronic image 6c.

[Equation 4]

correlation for $I$-phase (12)

$$\frac{1}{n} \sum_{i=a}^{n} f^1(i)(Y_i - \alpha)$$

correlation for $Q$-phase (13)

$$\frac{1}{n} \sum_{i=a}^{n} f^Q(i)(Y_i - \alpha)$$

When thus calculating the correlation values for the plurality of divided regions A, B, C, and D of the electronic image $6c$ at the time of the watermark embedding, the correlation detection unit 10 calculates the correlation values $C(I, A_{AD})$, $C(Q, A_{AD})$, $C(I, A_{BC})$, and $C(Q, A_{BC})$ about the two sets of the two diagonal regions (i.e., the regions A and D, and the regions B and C) according to the following equation (14), since a bit value 00 is embedded into the electronic image so that the variation applied to the brightness value of each adaptive pixel in one of the two diagonal regions is out of phase with the variation applied to the brightness value of each adaptive pixel in the other one of the two diagonal regions, where AAD shows the regions A and D, and ABC shows the regions B and C.

$$C(I,A_{AD})=\{C(I,A)-C(I,D)\}/2$$

$$C(Q,A_{AD})=\{C(Q,A)-C(Q,D)\}/2$$

$$C(I,A_{BC})=\{C(I,B)-C(I,C)\}/2$$

$$C(Q,A_{BC})=\{C(Q,B)-C(Q,C)\}/2 \qquad (14)$$

When the variation applied to the brightness values of each adaptive pixel in one of the two diagonal regions is made to be in phase with the variation applied to the brightness value of each adaptive pixel in the other one of the two diagonal regions, the user can recognize visually that the whole of the electronic image becomes bright or dark periodically according to the variations in the brightness of the entire screen. In contrast, when the variation applied to the brightness values of each adaptive pixel in one of the two diagonal regions is made to be out of phase with the variation applied to the brightness value of each adaptive pixel in the other one of the two diagonal regions, as mentioned above, the variations in the brightness of the entire screen can be cancelled.

The thus calculated correlation values $C(I, A_{AD})$, $C(Q, A_{AD})$, $C(I, A_{BC})$, and $C(Q, A_{BC})$ are outputted from the correlation detecting unit 10 to the embedded bit judgment unit 11. The embedded bit judgment unit 11 carries out determination of the embedded bit set which is based on the correlation detection results using the correlation values $C(I, A_{AD})$, $C(Q, A_{AD})$, $C(I, A_{BC})$, and $C(Q, A_{BC})$ from the correlation detecting unit.

FIG. 15 is a diagram showing a relationship between the correlation values and the embedded bit set. According to the relationship shown in this figure, the embedded bit judgment unit 11 determines the embedded bit set. Parameters x and z, and C(I) and C(Q) shown in the figure are acquired by the embedded bit judgment unit 11 using the correlation values $C(I,A_{AD})$, $C(Q,A_{AD})$, $C(I,A_{BC})$, and $C(Q,A_{BC})$ calculated by the correlation detecting unit 10.

C(I) is equal to $C(I,A_{AD})+C(I,A_{BC})$, and C(Q) is equal to $C(Q,A_{AD})+C(Q,A_{BC})$. Furthermore, x is equal to max(|C(I)|, |C(Q)|) which shows the absolute value of a larger one of C(I) and C(Q) which can be a candidate for a significant value. On the other hand, z shows the other one of C(I) and C(Q) which has a value close to 0, i.e., which cannot be a candidate for the significant value.

The embedded bit judgment unit 11 determines the embedded bit set by determining which relationship shown by the parameters x and z of FIG. 15 C(I) and C(Q) have.

The embedded bit judgment unit 11 further judges both the embedded bit value which it has determines through the Gap detection and the embedded bit value which it has determines through the correlation detection comprehensively so as to determine the embedded bit value finally and to output it.

FIG. 16 is a diagram showing a relationship between the embedded bit values which are determined through the Gap detection and correlation detection, and the finally-determined embedded bit value. As shown in the figure, in accordance with the present invention, the embedded bit set is determined complementarily through the Gap detection and correlation detection. For example, even if the result of one of the Gap detection and correlation detection indicates that the embedded bit set has not yet been detected, the embedded bit judgment unit can determine that the determination result indicating that the embedded bit set has not yet been detected has an error as long as the result of the other one of the Gap detection and correlation detection indicates the determination of a significant embedded bit value.

So, in accordance with the present invention, the result of one of the Gap detection and correlation detection indicating the determination of a significant embedded bit value in such a way as to complement the result of the other determination processing is adopted as a final determination result. By doing in this way, the reliability of the detection result of the electronic watermark, and the accuracy of the detection of the electronic watermark can be improved.

In order to control variations in the detection values obtained through the above-mentioned Gap detection and correlation detection, the Gap detecting unit 9 and correlation detecting unit 10 can perform clip processing on the detection results. For example, as shown in FIG. 17, when the detected Gap value associated with brightness variations becomes smaller than −1, the Gap detecting unit 9 adopts a preset clip value of −1 as the detected Gap value, and when the detected correlation value associated with brightness variations becomes smaller than −1, the correlation detecting unit 10 adopts a preset clip value of −1 as the detected correlation value. In contrast, when the detected Gap value associated with brightness variations becomes larger than +1, the Gap detecting unit 9 adopts a preset clip value of +1 as the detected Gap value, and when the detected correlation value associated with brightness variations becomes larger than +1, the correlation detecting unit 10 adopts a preset clip value of +1 as the detected correlation value.

By thus providing upper and lower limits for each of the detected Gap and correlation values so that each of them falls within a predetermined range, any fluctuations in each of the detected Gap and correlation values which occur depending upon the contents of the image which is the target of the Gap detection and correlation detection can be reduced, and the process of determining the embedded bit set can be carried out with stability.

Figure 18:
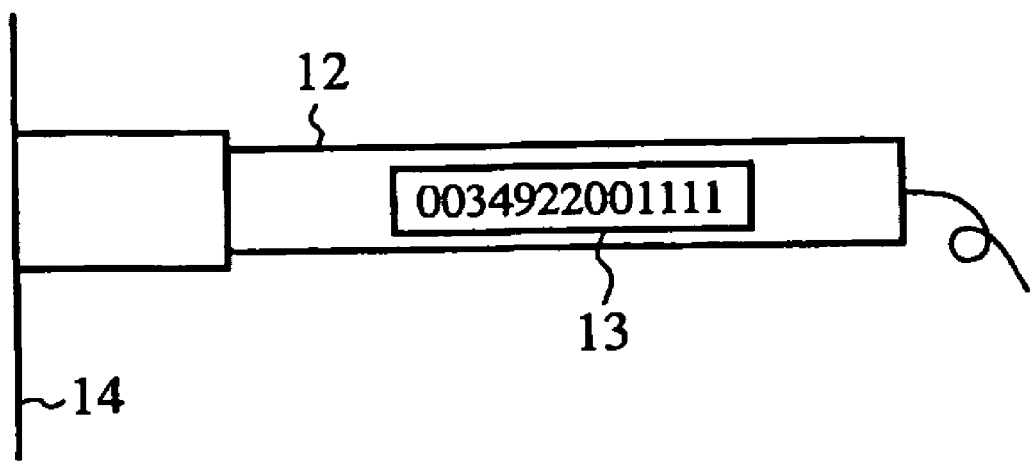
FIG. 18 is a diagram showing an example of application of the electronic watermark detecting apparatus in accordance with embodiment 4.

FIG. 18 is a diagram showing an example of application of the electronic watermark detecting apparatus in accordance with this embodiment 4. In the example shown, the electronic watermark detecting apparatus 8 is constructed as a pen type detector 12. A pen point of the pen type detector 12 is equipped with a video camera for capturing an image displayed on a monitor display 14, such as a CRT or LCD, and detects an electronic watermark by carrying out the above-mentioned processing. The pen type detector displays an embedded bit set which is a result of detection on a display window 13 so that the user can recognize that the electronic watermark in accordance with the present invention is embedded into the target image from which the electronic watermark is to be detected.

In this application, an electronic watermark in accordance with the present invention is embedded into a partial area of a target image into which the electronic watermark is to be embedded. When the user presses the pen point of the pen type detector against the above-mentioned electronic-water-mark-embedded area displayed on the monitor display, the pen type detector captures an image of the detection target area to carry out the process of detecting the electronic watermark. Since the pen type detector is so constructed as mentioned above, it can carry out detection of the electronic watermark easily while capturing an image played back on the monitor display 14.

As mentioned above, the electronic watermark detecting apparatus in accordance with this embodiment 4 determines the embedded bit set complementarily through the Gap detection and correlation detection. Therefore, the present embodiment offers an advantage of being able to improve the reliability of the detection result of the electronic watermark and the accuracy of the detection of the electronic watermark.

In above-mentioned embodiment 4, the example of judging both the embedded bit value which the electronic watermark detecting apparatus has determined through the Gap detection and the embedded bit value which the electronic watermark detecting apparatus has determined through the correlation detection complementarily so as to determine the embedded bit value finally is shown. However, the present invention is not limited to this structure.

For example, without providing the correlation detecting unit 10, the electronic watermark detecting apparatus can be so constructed that the embedded bit judging unit 11 determines the embedded bit set only from the Gap detection result obtained by the Gap detecting unit 9. In order to maintain detection accuracy with this structure, it is necessary to strictly achieve synchronization between the embedding intervals at which the electronic watermark is embedded into the image from which the electronic watermark is to be detected and the Gap detection intervals. However, since the time required for the correlation detection is omitted, the electronic watermark can be detected in real time while the recaptured image is played back.

Without providing the Gap detecting unit 9, the electronic watermark detecting apparatus can be so constructed that the embedded bit judging unit 11 determines the embedded bit set only from the correlation detection result obtained by the correlation detecting unit 10. In this structure, the correlation detecting unit 10 uses the average of the brightness values of all the pixels of frames (or fields) in the vicinity of the frame (or field) in which the correlation is detected in order to acquire the reference image data a which it uses for calculation of the correlation value, as mentioned above.

Therefore, this variant can reduce the influence due to the difference in the image contents of the target image from which the electronic watermark is to be detected, and can calculate the correlation value using the reference image which approximates the noted frame more precisely, thereby improving the accuracy of the detection of the electronic watermark.

INDUSTRIAL APPLICABILITY

As mentioned above, the electronic watermark embedding method in accordance with the present invention offers an advantage of maintaining the resistance of an electronic watermark embedded into an image to a recaptured image acquired by recapturing the image displayed on a display screen, such as a display, while reducing the visual disturbance caused by the embedding of the electronic watermark into the image remarkably, and is suitable for a technique for embedding an electronic watermark into a moving image.

The invention claimed is:

1. An electronic watermark embedding method comprising: a dividing processing step of dividing an electronic image into which an electronic watermark is to be embedded into a plurality of image regions spatially;

an adaptive extraction step of extracting, as adaptive pixels, pixels each having a property of being difficult to visually recognize a variation in a pixel value from each of said plurality of image regions; and an embedding step of producing a variation between the pixel values of said adaptive pixels in one of said plurality of image regions and those of said adaptive pixels in an adjacent one of said plurality of image regions, and varying the pixel values of said adaptive pixels of said plurality of image regions in a time direction, according to a value of an embedded bit set of an electronic watermark, and of generating an electronic-watermark-embedded image by making the variation in the pixel values of said adaptive pixels vary step by step at a boundary between the two of said plurality of image regions and in the time direction so that the variation makes a slow transition.

2. The electronic watermark embedding method according to claim 1, wherein in the embedding step, the embedded bit set is so expressed as to vary the variation between the two image regions and the variation in those of said adaptive pixels in the time direction so that the pixel values of said adaptive pixels in the one of said plurality of image regions have a phase polarity different from those of said adaptive pixels in the adjacent one of said plurality of image regions.

3. The electronic watermark embedding method according to claim 1, wherein in the adaptive extraction step, pixels each having a brightness level which is difficult to recognize visually even if a brightness variation associated with the embedding of the electronic watermark is added thereto is extracted as the adaptive pixels.

4. The electronic watermark embedding method according to claim 1, wherein in the adaptive extraction step, pixels each having a large pixel value variation in the time direction are extracted, as the adaptive pixels, on the basis of a pixel value difference in the time direction of the electronic image into which the electronic watermark is to be embedded.

5. The electronic watermark embedding method according to claim 1, wherein in the adaptive extraction step, the adaptive pixels are extracted from an edge portion of the electronic image into which the electronic watermark is to be embedded.

6. The electronic watermark embedding method according to claim 1, wherein in the embedding step, the embedding processing is carried out in synchronization with a scene change which occurs in the electronic image into which the electronic watermark is to be embedded.

7. An electronic watermark detecting method of detecting an embedded bit set of an electronic watermark to be detected from an electronic image into which the electronic watermark is embedded by using a method of dividing said electronic image into which the electronic watermark is to be embedded into a plurality of image regions spatially, producing a variation between pixel values in one of said plurality of image regions and those in an adjacent one of said plurality of image regions, and varying the pixel values of adaptive pixels of said plurality of image regions in a time direction according to a value of the embedded bit set, wherein said electronic watermark detecting method comprises: a Gap detection step of detecting, as a Gap value, a pixel value difference corresponding to a pixel value variation in the time direction which is caused by the embedding of the electronic watermark for each of said plurality of image regions of said electronic image from which the electronic watermark is to be detected; a correlation detection step of detecting a correlation value showing a correlation between a pattern of the pixel value variation in the time direction which is produced between the pixel values in the one of said plurality of image regions and those in the adjacent one of said plurality of image regions, which is caused by the electronic watermark to be embedded in said electronic image from which the electronic watermark is to be detected, and a pattern of the pixel value variation in the time direction of the one of said plurality of image regions of said electronic image from which the electronic watermark is to be detected; and an embedded bit judgment step of judging said embedded bit set from results of the detection of said Gap value and the detection of said correlation value for each of said plurality of image regions, and judging results of the judgment' complementarily so as to determine the embedded bit set finally.

8. The electronic watermark detecting method according to claim 7, wherein in the Gap detection step, a difference between averages of pixel values of two image data located in a vicinity of noted image data in the time direction is calculated as the Gap value, the two image data being included in plural image data in the time direction which constitute the electronic image from which the electronic watermark is to be detected.

9. The electronic watermark detecting method according to claim 7, wherein in the correlation detection step, averages of pixel values of image data located in a vicinity of noted image data in the time direction are sequentially calculated as reference images, the image data being included in plural image data in the time direction which constitute the electronic image from which the electronic watermark is to be detected, and a correlation value showing a correlation between a pattern of variations in the pixel values of these reference image and a pattern of variations in pixel values of the electronic watermark to be embedded into the electronic image from which the electronic watermark is to be detected is calculated.

10. The electronic watermark detecting method according to claim 7, wherein in each of the Gap detection step and the correlation detection step, a clip process of restricting the detected value so that it falls within a range defined by upper and lower limits is carried out.

11. The electronic watermark detecting method according to claim 7, wherein in each of the Gap detection step and the correlation detection step, the detection process is carried out in synchronization with a scene change which occurs in the electronic image from which the electronic watermark is to be detected.

12. The electronic watermark detecting method according to claim 7, wherein in each of the Gap detection step and the correlation detection step, any image data which is included in the plural image data which constitute the electronic image from which the electronic watermark is to be detected and which has disorder which originates from the scene change is not used for the detection process.

13. An electronic watermark embedding apparatus comprising:
a dividing processing unit for dividing an electronic image into which an electronic watermark is to be embedded into a plurality of image regions spatially;
an adaptive extraction unit for extracting, as adaptive pixels, pixels each having a property of being difficult to visually recognize a variation in a pixel value from each of said plurality of image regions;
a watermark information generating unit for generating electronic watermark information which produces a variation between the pixel values of said adaptive pixels in one of said plurality of image regions and those of said adaptive pixels in an adjacent one of said plurality of image regions, and which varies the pixel values of said adaptive pixels of said plurality of image regions in a time direction, according to a value of an embedded bit set of an electronic watermark; and
an embedding processing unit for varying the pixel values of said electronic image on the basis of said electronic watermark information, and for generating an electronic-watermark-embedded image by making the variation in the pixel values of said adaptive pixels vary step by step at a boundary between the two of said plurality of image regions and in the time direction so that the variation makes a slow transition.

14. An electronic watermark detecting apparatus for detecting an embedded bit set of an electronic watermark to be detected from an electronic image into which the electronic watermark is embedded by using a method of dividing said electronic image into which the electronic watermark is to be embedded into a plurality of image regions spatially, producing a variation between pixel values in one of said plurality of image regions and those in an adjacent one of said plurality of image regions, and varying the pixel values of adaptive pixels of said plurality of image regions in a time direction according to a value of the embedded bit set, wherein said electronic watermark detecting apparatus comprises: a Gap detecting unit for detecting, as a Gap value, a pixel value difference corresponding to a pixel value variation in the time direction which is caused by the electronic watermark embedding for each of said plurality of image regions of said electronic image from which the electronic watermark is to be detected; a correlation detecting unit for detecting a correlation value showing a correlation between a pattern of the pixel value variation in the time direction which is produced between the pixel values in the one of said plurality of image regions and those in the adjacent one of said plurality of image regions, which is caused by the electronic watermark to be embedded in said electronic image from which the electronic watermark is to be detected, and a pattern of the pixel value variation in the time direction of the one of said plurality of image regions of said electronic image from which the electronic watermark is to be detected; and an embedded bit determining unit for determining said embedded bit set from results of the detection of said Gap value and the detection of said correlation value for each of said plurality of image regions, and for judging results of the determination complementarily so as to determine the embedded bit set finally.

15. The electronic watermark detecting apparatus according to claim 14, wherein the Gap detecting unit calculates, as the Gap value, a difference between averages of pixel values of two image data located in a vicinity of noted image data in the time direction, the two image data being included in plural image data in the time direction which constitute the electronic image from which the electronic watermark is to be detected.

16. The electronic watermark detecting apparatus according to claim 14, wherein the correlation detecting unit sequentially calculates, as reference images, averages of pixel values of image data located in a vicinity of noted image data in the time direction, the image data being included in plural image data in the time direction which constitute the electronic image from which the electronic watermark is to be detected, and also calculates a correlation value showing a correlation between a pattern of variations in the pixel values of these reference image and a pattern of variations in pixel values of the electronic watermark to be embedded into the electronic image from which the electronic watermark is to be detected.

17. A non-transitory computer readable medium having stored thereon computer executable program, the computer program when executed causes a computer to function as an electronic watermark embedding apparatus comprising: a dividing processing unit for dividing an electronic image into which an electronic watermark is to be embedded into a plurality of image regions spatially; an adaptive extraction unit for extracting, as adaptive pixels, pixels each having a property of being difficult to visually recognize a variation in a pixel value from each of said plurality of image regions; a watermark information generating unit for generating electronic watermark information which produces a variation between the pixel values of said adaptive pixels in one of said plurality of image regions and those of said adaptive pixels in an adjacent one of said plurality of image regions, and which varies the pixel values of said adaptive pixels of said plurality of image regions in a time direction, according to a value of an embedded bit set of an electronic watermark; and an embedding processing unit for varying the pixel values of said electronic image on the basis of said electronic watermark information, and for generating an electronic-watermark-embedded image by making the variation in the pixel values of said adaptive pixels vary step by step at a boundary between the two of said plurality of image regions and in the time direction so that the variation makes a slow transition.

18. A non-transitory computer readable medium having stored thereon computer executable program, the computer program a computer to function as an electronic watermark detecting apparatus for detecting an embedded bit set of an electronic watermark to be detected from an electronic image into which the electronic watermark is embedded by using a method of dividing said electronic image into which the electronic watermark is to be embedded into a plurality of image regions spatially, producing a variation between pixel values in one of said plurality of image regions and those in an adjacent one of said plurality of image regions, and varying the pixel values of adaptive pixels of said plurality of image regions in a time direction according to a value of the embedded bit set, wherein said program causes said computer to function as a Gap detecting unit for detecting, as a Gap value, a pixel value difference corresponding to a pixel value variation in the time direction which is caused by the electronic watermark embedding for each of said plurality of image regions of said electronic image from which the electronic watermark is to be detected; a correlation detecting unit for detecting a correlation value showing a correlation between a pattern of the pixel value variation in the time direction which is produced between the pixel values in the one of said plurality of image regions and those in the adjacent one of said plurality of image regions, which is caused by the electronic watermark to be embedded in said electronic image from which the electronic watermark is to be detected, and a pattern of the pixel value variation in the time direction of the one of said plurality of image regions of said electronic image from which the electronic watermark is to be detected; and an embedded bit determining unit for determining said embedded bit set from results of the detection of said Gap value and the detection of said correlation value for each of said plurality of image regions, and for judging results of the determination complementarily so as to determine the embedded bit set finally.

19. The non-transitory computer readable medium according to claim 18, wherein the Gap detecting unit calculates, as the Gap value, a difference between averages of pixel values of two image data located in a vicinity of noted image data in the time direction, the two image data being included in plural image data in the time direction which constitute the electronic image from which the electronic watermark is to be detected.

20. The non-transitory computer readable medium according to claim 18, wherein the correlation detecting unit sequentially calculates, as reference images, averages of pixel values of image data located in a vicinity of noted image data in the time direction, the image data being included in plural image data in the time direction which constitute the electronic image from which the electronic watermark is to be detected, and also calculates a correlation value showing a correlation between a pattern of variations in the pixel values of these reference image and a pattern of variations in pixel values of the electronic watermark to be embedded into the electronic image from which the electronic watermark is to be detected.

21. The electronic watermark embedding method according to claim 1, wherein in the embedding step, the embedded bit set is so expressed as to vary the variation between the two image regions in the time direction so that the pixel values of said adaptive pixels in the one of said plurality of image regions have a phase polarity different from those of said adaptive pixels in the adjacent one of said plurality of image regions.

22. The electronic watermark embedding method according to claim 1, wherein in the embedding step, the embedded bit set is so expressed as to vary the variation in those of said adaptive pixels in the time direction so that the pixel values of said adaptive pixels in the one of said plurality of image regions have a phase polarity different from those of said adaptive pixels in the adjacent one of said plurality of image regions.

* * * * *